April 18, 1961 D. G. HOLLOWAY 2,980,765

TRANSMISSION OF TELEVISION SIGNALS

Filed Nov. 26, 1954 4 Sheets-Sheet 1

INVENTOR
Dennis G. Holloway
BY
Ralph B. Stewart
ATTORNEY

INVENTOR
Dennis G. Holloway
BY
Ralph B. Stewart
ATTORNEY

INVENTOR
Dennis G. Holloway
BY
Ralph B. Stewart
ATTORNEY

INVENTOR
Dennis G. Holloway
BY
Kemon, Palmer & Stewart
ATTORNEYS 2,980,765

TRANSMISSION OF TELEVISION SIGNALS

Dennis Godson Holloway, Taplow, England, assignor to British Telecommunications Research Limited, Taplow, England Filed Nov. 26, 1954, Ser. No. 471,477
Claims priority, application Great Britain Dec. 3, 1953
2 Claims. (Cl. 178—43.5)

Figure 1:
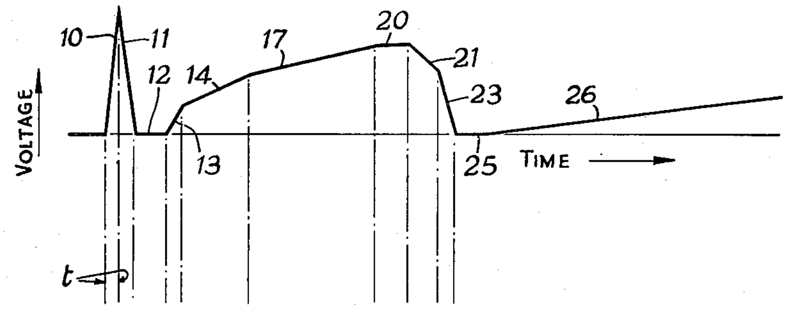

The present invention relates to the transmission of television signals in which a decrease in band-width or an increase in the signal-to-noise ratio is achieved by rejecting some information which is normally transmitted but which is found not to be important subjectively.

The invention has for its object to provide an improved method and means for effecting such transmission.

The invention is based upon the subjective observation that a high degree of accuracy in reproducing the amplitude of a television signal is only required in areas of low detail and that in regions of high detail, such as sharp-edges, a greater tolerance is permitted. One system of transmission which is based upon this observation is set forth in the specification of British Patent 722,769.

According to one aspect of the present invention a method of generating, for transmission, a signal representative of a television signal waveform comprises generating, at intervals, code pulses having amplitudes, selected from a predetermined finite number of fixed amplitudes, each of which represents the rate of change of voltage which will most nearly reduce to zero the difference between the part of the signal waveform preceding the pulse and a derived television signal which can be generated from the code pulses preceding the said pulse, the amplitudes of the code pulses being non-linearly related to the rate of change of voltage in such a manner that a given difference in the rate of change of voltage is represented by a greater change in code pulse amplitude at low rates of change of voltage than at high rates of change of voltage.

The invention also provides a method of generating, for transmission, a signal representative of a television signal waveform comprising sampling the said waveform at a predetermined frequency, generating code pulses having amplitudes, selected from a predetermined finite number of fixed amplitudes, which represent the rate of change of voltage which will most nearly reduce to zero, in each sampling period, the difference between the part of said signal waveform occurring before said sampling period and a derived television signal which can be generated from the code pulses transmitted before said sampling period, the amplitudes of the code pulses being non-linearly related to the rate of change of voltage in such a manner that a given difference in the rate of change of voltage is represented by a greater change in code pulse amplitude at low rates of change of voltage than at high rates of change of voltage.

It will be understood, therefore, that the present invention as set forth in the preceding paragraph makes use of what is known as delta pulse code modulation with the modification that the amplitude of the code pulses is varied and that the variation in amplitude of the coded pulses is such that a given change in picture brightness occurring at a low frequency is represented to a higher degree of accuracy than the same change in brightness occurring at a higher frequency.

The method of the present invention obtains the advantage of delta pulse code modulation that errors in the transmission of a waveform are not cumulative: in effect at each sampling period the information that has been sent up to that time is compared with the information that should have been sent and there is transmitted a code pulse which will most nearly correct any error observed.

It will be understood that the words "most nearly" are to be read sufficiently broadly to cover the case where, when information to be transmitted has a value between two values that can be represented by two different code pulses respectively, either of these code pulses may be transmitted.

If the duration of the sampling periods is indefinitely reduced, in the limit the use of delta pulse code modulation becomes a mathematical differentiation of the television waveform. The non-linear relation between code pulse amplitude and the rate of change of voltage corresponds to compression of the differentiated waveform. Certain of the advantages of the invention can, therefore, be obtained without the use of pulse code.

According to the invention in another aspect, therefore, a method of generating, for transmission, a transmission signal representative of a television signal waveform comprises the steps of generating a derived waveform which represents substantially the differential of the television signal waveform and compressing the amplitude of the derived waveform to reduce large amplitudes to a greater extent than small amplitudes.

At a receiver the signals are applied to an expander circuit which is the complement of the compressor circuit used at the transmitter and then to an integrating circuit.

Figure 2:
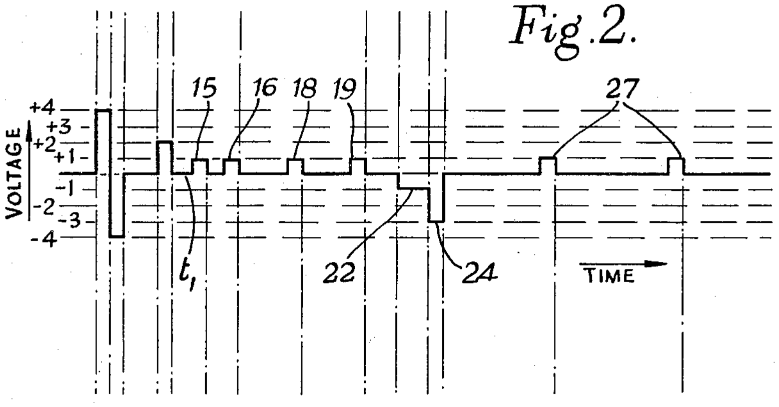
Figure 3:
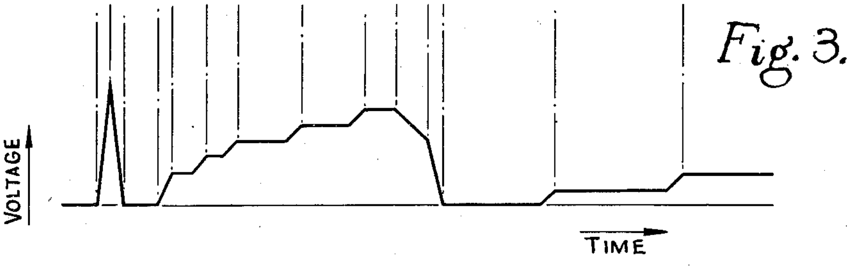
Figure 4:
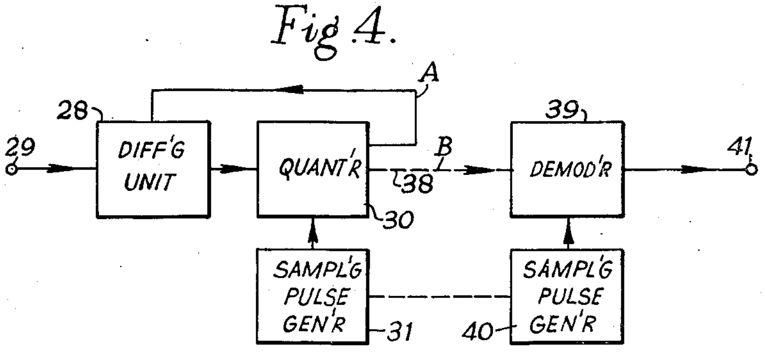
Figure 5:
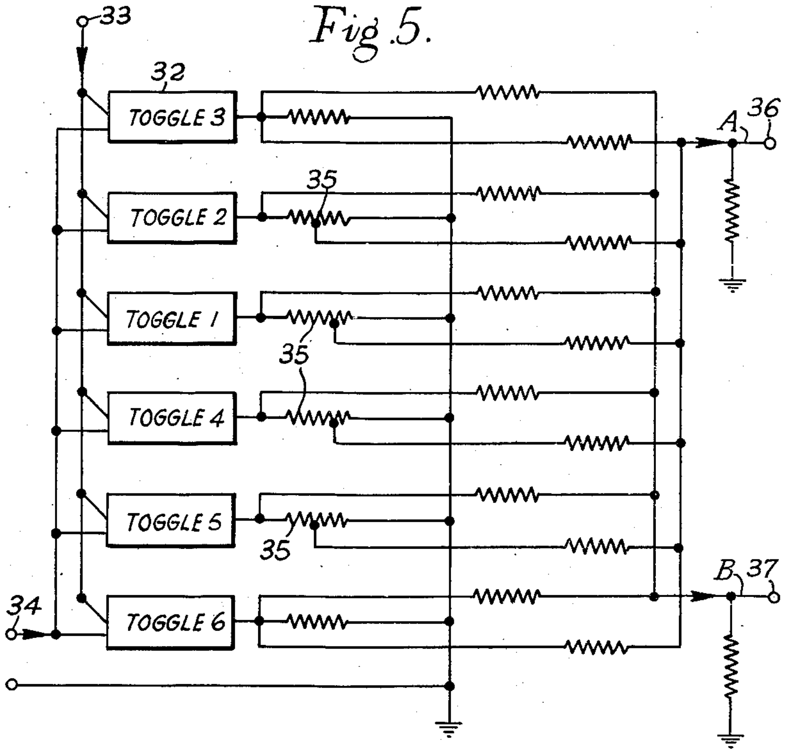
Figure 6:
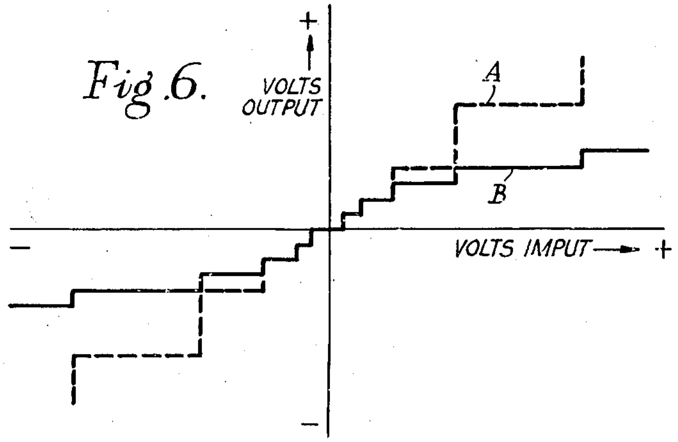
Figure 7:
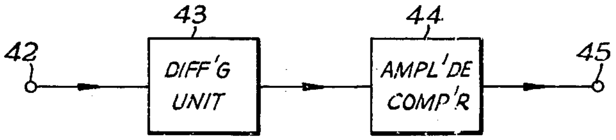
Figure 8:
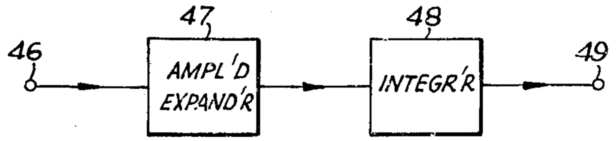
Figure 9:
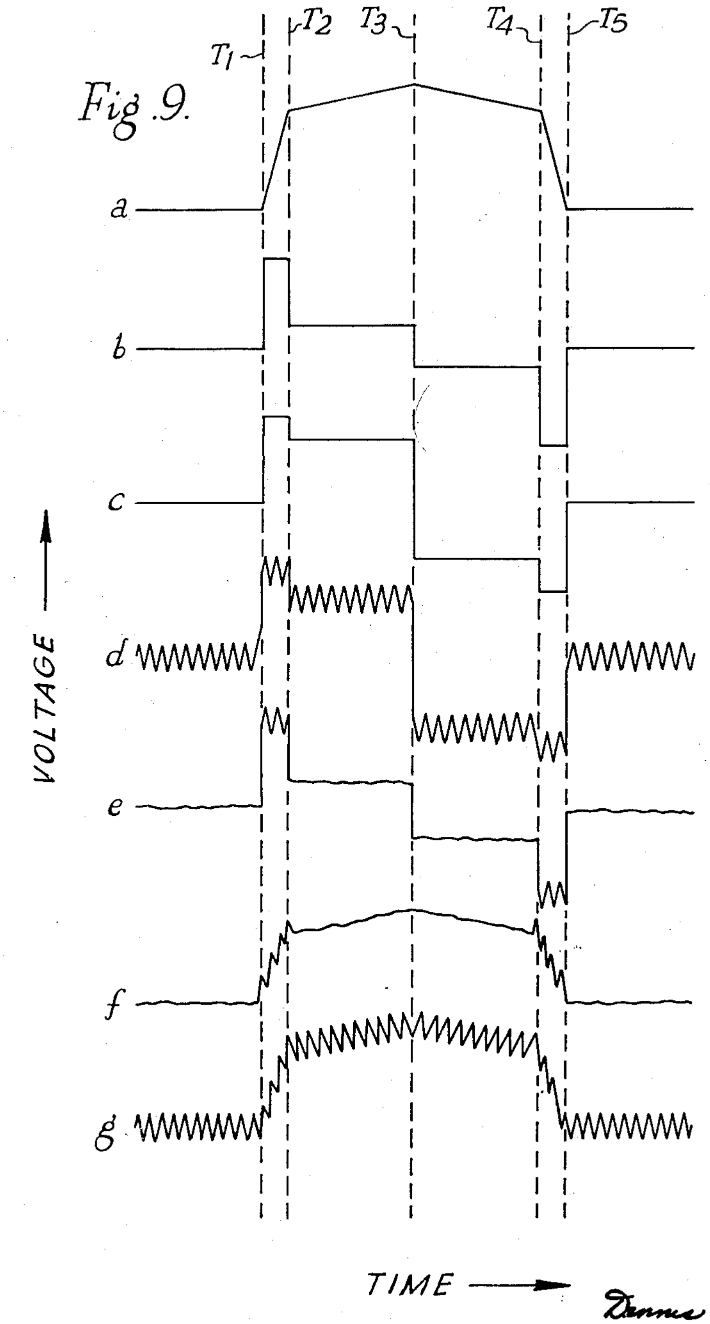

The invention will be described by way of example with reference to the accompanying drawings in which Fig. 1 shows a waveform to be transmitted using pulse code modulation, Fig. 2 shows the coded signals which are derived from the waveform of Fig. 1 and transmitted, Fig. 3 shows the waveform that can be derived, at a receiver, from the signals of Fig. 2, Fig. 4 is a block circuit diagram showing one way in which the method of the invention can be carried out, Fig. 5 shows one form that the quantiser in Fig. 4 may take, Fig. 6 is a diagram showing the relation between the input and outputs of the quantiser in Fig. 5, Figs. 7 and 8 are block circuit diagrams of a transmitter a receiver for carrying out the method of the invention in a modified form, and Fig. 9 shows the wave forms at the transmitter and receiver shown in Figs. 7 and 8 respectively.

In each of Figures 1 to 3 voltage is plotted as ordinate against time as abscissa.

In this method positive-going code pulses are used to represent increases in amplitude, negative-going pulses to represent decreases in amplitude and no pulses to represent no change in amplitude. Only four different code pulse amplitudes in each sense are used in this example, although, of course, a greater number may be used if necessary.

The following table shows the significance of the nine transmitted code pulse levels:

| Pulse Amplitude | Meaning |
|---|---|
| +4 | 1 x maximum rate of rise |
| +3 | ½ x maximum rate of rise |
| +2 | ¼ x maximum rate of rise |
| +1 | ⅛ x maximum rate of rise |
| 0 | No change in amplitude |
| −1 | ⅛ x maximum rate of fall |
| −2 | ¼ x maximum rate of fall |
| −3 | ½ x maximum rate of fall |
| −4 | 1 x maximum rate of fall |

Thus nine pulse levels are required and the smallest change in brightness represented is 1/8 of the maximum. In order to represent this degree of detail with normal delta pulse modulation (not employing the aforesaid non-linear relation between pulse amplitude and rate of change of slope) a total of 17 different levels would have to be transmitted, namely 8 rates of rise, 8 rates of fall and 1 no change.

Referring now to Figs. 1 to 3, one sampling period is represented by the interval $t$ between two adjacent broken lines. It is assumed that the slopes at 10 and 11 of the television wave-form of Fig. 1 are exactly represented by the pulse amplitudes +4 and −4 in Fig. 2 and consequently the portion 12 of the television waveform is represented in Fig. 2 by no pulses. The portion 13 has a slope represented by a pulse of amplitude 2. The slope at 14 is less than that represented by a pulse of amplitude 1 and hence no pulse is transmitted in the sampling period $t_1$. The two pulses 15 and 16 of unit amplitude occurring after $t_1$ adequately represent the slope of 14. The slope at 17 is even less and is represented by more widely-spaced pulses 18 and 19. The pulse 19 is assumed to have corrected all errors that have occurred up to that time and consequently when the waveform assumes zero slope at 20, no pulse is transmitted. The slope at 21 is adequately represented by two negative pulses of unit amplitude and consequently negative pulses 22 of unit amplitude occur throughout the two sampling periods of the slope 21. The slope at 23 is represented accurately by the pulse 24 of amplitude −3 and consequently when the slope becomes zero at 25 no pulse is transmitted. The slope at 26 is much below that corresponding to a pulse of unit amplitude and hence is represented by the widely-spaced pulses 27.

The waveform of Fig. 3 will be seen to be that which can be derived from the signals of Fig. 2. The waveform is stepped whenever the slope differs from one of the slopes represented by a code pulse but otherwise closely resembles the original waveform of Fig. 1.

It might be thought that the maximum possible errors already referred to would be noticeable if they repeated themselves in successive scanning lines; for instance they might be noticeable after an edge transverse to the direction of scanning. However it is to be noted that the way in which previous errors are dealt with depends not only on the magnitude of the error following the edge but also on the variations in the picture preceding the edge so that very small variations may cause the error to change from an overshoot to an undershoot. This means that the error pattern will tend to become almost random and that it is very unlikely to repeat itself accurately enough to form a recognisable pattern.

If necessary, an additional signal may be deliberately imposed upon the television signals at the transmitter and removed at the receiver, this additional signal being designed to ensure that errors are corrected in a substantially random manner. The additional signal may consist of a single sine wave of suitable frequency.

It will be evident that when signals are transmitted in accordance with the present invention, any noise will affect the signals representative of high detail more than those representative of low detail and this is found to be more tolerable than where noise affects signals of all degrees of detail to an equal extent.

It has hitherto been assumed that the channel over which transmission takes place has a substantially flat amplitude/frequency characteristic. This should be true of the whole transmission path including any equalisers but the shaping of the signal frequency chaarcteristic into the transmission medium will, in general, be chosen in relation to the shape of the noise spectrum of the system in such a manner as to give a favourable value of signal-to-noise ratio.

It will be evident to those skilled in the art that the above-described methods can be carried out with a variety of different forms of apparatus. By way of example one suitable form of apparatus is shown in Fig. 4. It comprises a unit 28 having an input terminal 29 to which normal television signals are applied. The output of the unit 28 is fed to a quantiser 30 to which are also fed pulses at sampling frequency from a generator 31. One output A of the quantiser 30 is fed back to the unit 28 in such a way that it is subtracted from the input applied at 29, and another output of the quantiser is marked B.

The quantiser 30 may, as shown in Fig. 5, comprise a number of toggle circuits 32. In this example six such circuits are shown, three, namely numbers 1, 2 and 3, to respond to positive-going input signals and the others, namely 4, 5 and 6, to respond to negative-going input signals. Sampling pulses from the generator 31 in Fig. 4 are applied to the toggles at a terminal 33 and signals from the unit 28 are applied at a terminal 34.

The toggle circuits are so arranged by suitable biasing that with amplitudes of input signals at 34 exceeding a first level but not exceeding a second level only toggle 1, in the case of a positive input signal or toggle 4, in the case of a negative input signal is operated, the operation in either case taking place only when a sampling pulse is applied. With an input at 34 between the second level and a third level, toggles 1 and 2, or 4 and 5, operate, and with levels above the third level toggles 1, 2 and 3, or 4, 5 and 6, operate, in each case, of course, only when a sampling pulse is applied.

By means of potentiometers 35, suitably different proportions of the outputs of the toggle circuits are applied to a terminal 36, while the whole of the outputs are applied to a terminal 37. The relations between the input at terminal 34 and the outputs A and B at terminals 36 and 37, respectively, are shown in Fig. 6, A being in broken lines. The relations shown are obtained by appropriate adjustments of the potentiometers 35.

As shown in Fig. 4 the output of the quantiser at 38 is transmitted through any desired channel. At a receiver the signal is applied to a demodulator 39 associated with a sampling pulse generator 40 which is synchronised with the generator 31 at the transmitter, for example by means of suitable signals transmitted over the same channel as the signals from terminal 38. A television waveform of the character shown in Fig. 3 is then obtained at a terminal 41.

As shown in Fig. 7, in a modified method according to the invention, a television signal is applied at a terminal 42 to a differentiating unit 43 and the output of this unit is applied to an amplitude compressor 44 which reduces large amplitudes (corresponding to large rates of change of the television signal) to a greater extent than small amplitudes. The output at a terminal 45 is transmitted. This output received at a terminal 46 in Fig. 8 is applied to an amplitude expander, which performs a function complementary to that of the compressor 44, and then to an integrating circuit which acts as the inverse of the differentiating circuit 43. The television signal is taken at terminal 49.

In Figure 9, curve *a* represents a typical television signal. It has a period of high slope between period $T_1$ and $T_2$ followed by longer periods of low slope $T_2$ to $T_3$, $T_3$ to $T_4$ and another high slope portion between $T_4$ and $T_5$. As described on the first page of the specification, the object of the invention is to make use of the fact that inaccuracies are less visible in periods of high slope than in periods of low slope. This is largely due to the fact that periods of high slope must of necessity be of short duration, whereas periods of low slope can be of large duration and thus occupy large areas on the screen. The eye is capable of detecting inaccuracies more on large areas than on small areas. The signal shown by *a* of Fig. 9 is impressed at terminal 42 of Fig. 7. After passing through the differentiating unit 43 a signal appears as in curve *b*. This signal is now compressed in amplitude compressor 44.

The output from such a device is now represented by curve *c* and for illustration it will be assumed that the relative gain is unity for the period $T_1$ to $T_2$ and is increased by 10 db during the period $T_2$—$T_3$ and $T_3$—$T_4$ and is unity again during the period $T_4$ to $T_5$. The value during the period before $T_1$ and after $T_5$ when the derived signal is zero can be suppressed to any desired extent. We will assume that this limiting loss is 20 db relative to the gain at $T_1$ to $T_2$. The compressed signal represented by *c* is now carried by the transmission with and it is within this transmission path that the interference or noise, which will cause loss of accuracy, is introduced. Curve *d* represents the received signal at the ends of this transmission medium. The interfering signal or noise has a constant average amplitude over all parts of the wave-form. This is the signal received at terminal 46 of Fig. 8. It is now passed to the amplitude expander.

In order that the overall gain from terminal 42 of Fig. 7 to terminal 49 of Fig. 8 shall be unity for all signal levels, the expander gain is arranged to compensate for the variable gains introduced in the compressor 44. Thus if we take the gain during period $T_1$ to $T_2$ as unity that from $T_2$ to $T_3$ and $T_3$ to $T_4$ will be 10 db higher and that preceding $T_1$ and succeeding $T_5$ will be 20 db above unity. The output from expander 47 will, therefore, be as shown by curve *e* where the signal corresponding to that of curve *b* has impressed upon it noise whose amplitude varies during the different time intervals, representing different signal slopes in the original signal of curve *a*. The signal of curve *e* is now passed through intergrator 48 and appears on terminal 49 of Fig. 8 as the wave-form of *f*. It can now be seen that this is a reproduction of the original signal represented by curve *a* but the interfering signal is now more visible on the high slope portions of the line than it is on low slope portions of the line.

Subjective observations mentioned on the first page of the specification are such that the wave-form shown by *f* is preferable to that shown at *g* which would be wave-form produced by a similar impressed signal transmitted over a similar transmission medium with the same peak amplitude and noise level but without the addition of the devices portrayed in Figs. 7 and 8 of our specification.

The present invention including a differentiating unit before the compressor and an integrating unit after the expander, enable a wave-form to be produced where low amplitude portions of this wave-form represent low slope portions of the original wave-form so that the compandor action now produces the desired result on the final picture of reducing the effect of interference on areas of low slope, such as large plain areas in the transmitted picture.

The present invention can be applied to the transmission of television signals generated as described in a paper by E. C. Cherry and G. G. Gouriet: "Some Possibilities for the Compression of Television Signals by Recoding," published in the Journal of the Institution of Electrical Engineers, Part III, January 1953.

I claim:

1. Apparatus for modifying television signals before their transmission comprising differentiating means deriving substantially the first derivative of said signals, amplitude compression means comprising non-linear signal amplifying means producing a relatively greater gain in response to changes in signals of small amplitude than to corresponding changes in signals of large amplitude, and means coupling said differentiating means to apply said first derivative signal to the input of said compression means.

2. A television system comprising, at a transmitting station, means for deriving from the video signal a differential signal which represents substantially the rate of change of amplitude of the video signal waveform, means for compressing the amplitude of said differential signal comprising non-linear signal responsive means for producing a relatively greater response to changes in signals of small amplitude than to corresponding changes in signals of large amplitude, means for transmitting said compressed signal to a receiving station, non-linear responsive means at the receiving station for expanding the amplitude of the received signal to restore the amplitude relations of said differential signal, and means for integrating said expanded-amplitude signal to reconstitute the original video signal.

References Cited in the file of this patent

UNITED STATES PATENTS

| | | |
|---|---|---|
| 2,408,078 | Labin et al. | Sept. 24, 1946 |
| 2,498,675 | Grieg | Feb. 28, 1950 |
| 2,527,650 | Peterson | Oct. 31, 1950 |
| 2,530,538 | Rack | Nov. 21, 1950 |
| 2,538,266 | Pierce | Jan. 16, 1951 |
| 2,582,968 | Deloraine | Jan. 22, 1952 |
| 2,617,879 | Sziklai | Nov. 11, 1952 |
| 2,625,604 | Edson | Jan. 13, 1953 |
| 2,636,081 | Feldman | Apr. 21, 1953 |
| 2,662,118 | Schouten et al. | Dec. 8, 1953 |
| 2,664,462 | Bedford | Dec. 29, 1953 |
| 2,784,256 | Cherry | Mar. 5, 1957 |
| 2,795,650 | Levine | June 11, 1957 |
| 2,803,702 | Ville et al. | Aug. 20, 1957 |